Patented May 30, 1944

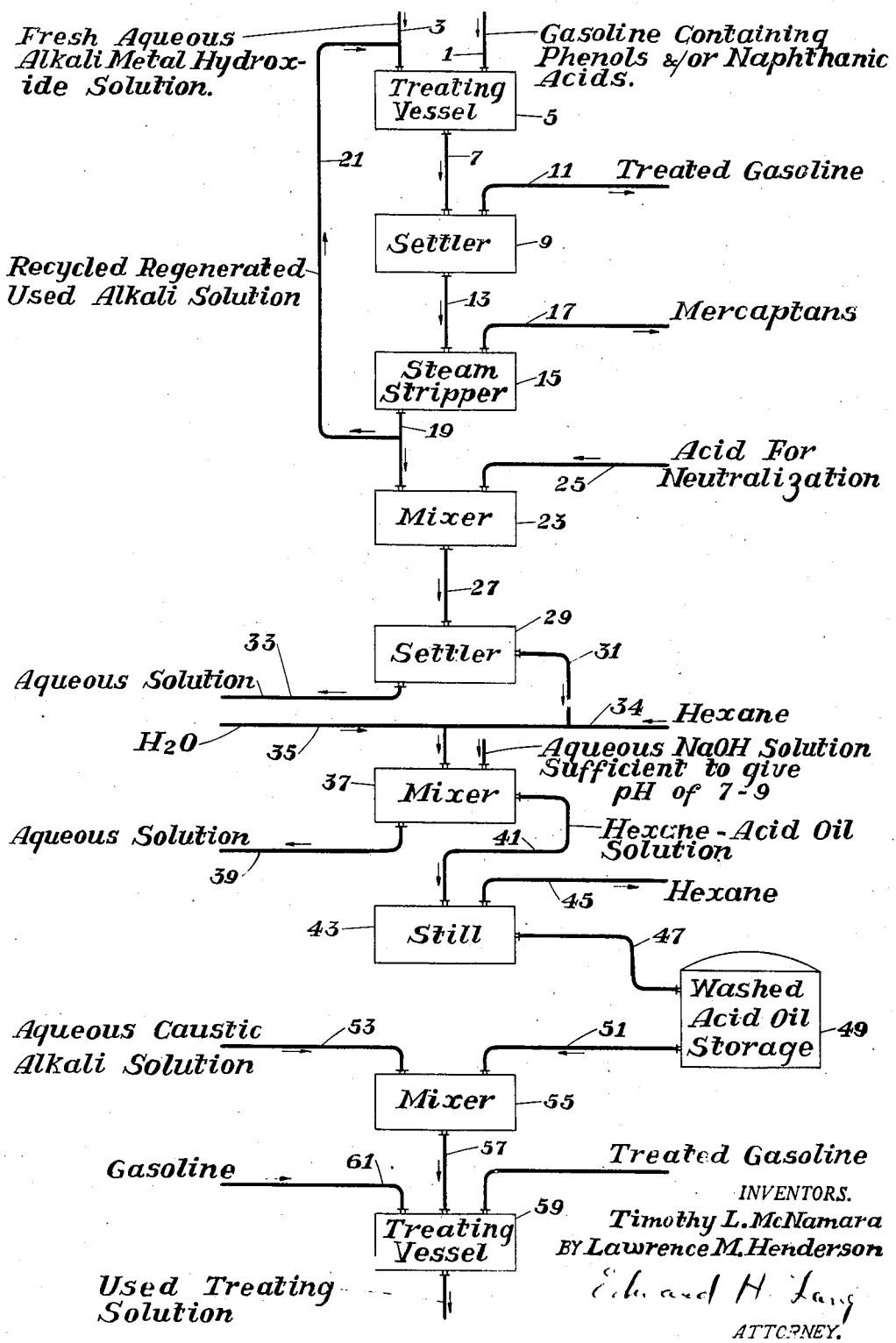

2,350,176

UNITED STATES PATENT OFFICE 2,350,176

METHOD FOR TREATING HYDROCARBON OIL

Timothy L. McNamara, Arlington Heights, and Lawrence M. Henderson, Winnetka, Ill., assignors to The Pure Oil Company, Chicago, Ill., a corporation of Ohio Application December 30, 1940, Serial No. 372,355

4 Claims. (Cl. 196—30)

This invention relates to a method for removing weakly acidic substances from water immiscible liquids and more particularly to method and reagent for removal of mercaptans and other acidic organic sulfur compounds from hydrocarbon oils.

It is common practice in the petroleum refining industry to treat petroleum distillates, particularly cracked distillates with alkali solutions in order to remove acidic organic sulfur compounds, such as mercaptans.

It is known that the efficacy of alkaline-reacting solutions in removing mercaptans from hydrocarbon liquids can be materially improved by adding to such solutions various compounds such as alkali salt of the more volatile members of the fatty acid series, for example, sodium or potassium isobutyrate. The use of such salts, commonly known as solutizers, has proved beneficial but the amount of mercaptans removed with these reagents is not as great as is frequently desired.

It has been found that excellent results may be obtained by the use of aqueous alkali solution containing a cheap, readily available material obtained in the course of ordinary refining operations. Such material is acid oil which has been prepared in a particular manner as hereinafter set forth, to greatly improve its properties as a solutizer. Such acid oil may be obtained from aqueous alkaline solutions such as sodium hydroxide solutions which have been used to treat petroleum oils especially cracked petroleum distillates containing acidic compounds such as naphthenic and/or other organic acids and/or phenolic and thiophenolic compounds. These acidic materials are separable upon acidification of such used alkali solutions and separate as an oily layer which is generally called "acid oil" or "acid oils." Acidification of such used alkali solution may be effected by addition of mineral acids, acid salts, carbon dioxide or other materials known to be suitable for effecting this result. Separation of the acid oils from the aqueous layer may be facilitated by dissolving the oil in a suitable solvent such as hexane or petroleum naphtha. This has a tendency to reduce mechanical losses and to effect a more rapid and complete settling into homogeneous layers. Separation of the solvent from the acid oils may be readily effected by distillation.

It is an object of this invention to provide an improved method of removing organic acidic compounds, particularly sulfur compounds, from water immiscible liquids such as hydrocarbon oils.

It is another object of this invention to provide a composition of matter which is highly useful in enhancing the ability of aqueous alkali solutions for removing organic acidic compounds, especially sulfur compounds, from water immiscible liquids such as hydrocarbon oils.

The single figure of the drawing is a flow sheet of the various steps involved in preparing acid oil in accordance with our invention.

It is common practice in the art of recovering acid oils from aqueous alkali solutions which have been employed to wash petroleum fractions such as cracked distillates to precipitate or "spring" the acid oils from the alkali solutions by acidifying the solution. By "acidifying" is meant a reduction of the pH below 7. This may be effected by adding one or a mixture of more than one of well known acidic materials to such used alkali solutions. Such acid oils are known to enhance the ability of aqueous alkali solutions for removing organic acidic compounds from petroleum distillates.

It has now been discovered that when acid oils are treated to separate therefrom a portion which reacts with alkaline solution (a solution having a pH in excess of 7) having a pH not substantially greater than 9, the treated oils, that is, the unreacted portions have unusual ability in enhancing the properties of aqueous alkali solutions for extracting weakly acidic organic compounds, for example, mercaptans from petroleum oils. Acid oils having desirable characteristics in accordance with this invention may be prepared by treating acid oils per se with suitable quantities of alkaline solutions so that the resulting aqueous layer is alkaline but not substantially more alkaline than pH 9. This operation is conducted in the presence of a sufficient amount of water to dissolve reaction products of the alkali and acid oil. A volume of water (equivalent to) twice that of the acid oil treated has been found to be quite satisfactory.

If, in the aforementioned procedure, the resulting aqueous layer in contact with the treated acid oil is below pH 7, the efficacy of the acid oil is not appreciably improved and if the pH is greater than 9, desirable portions of the acid oil are soluble in the aqueous layer and are thereby lost. Particularly effective acid oils may be obtained when the aqueous solution in contact with the treated acid oils is approximately 8.1. The beneficial effect of the acid oils prepared in accordance with this invention may be secured by simply dissolving the acid oils treated as heretofore described in aqueous alkali solutions and employing the resulting solution as a treating reagent in much the same manner as that commonly used for aqueous sodium hydroxide solutions.

Referring to the drawing, gasoline is charged through line 1 together with fresh aqueous alkali metal hydroxide solution charged through line 3 into a treating vessel 5, wherein the alkali solution and gasoline are intimately contacted. The contents of vessel 5 are passed through line 7 into settler 9 from which treated gasoline is withdrawn from the top through line 11 and the used alkali solution is withdrawn through line 13. The used alkali solution passes to steam stripper 15 wherein mercaptans are stripped from the used alkali by blowing live steam therethrough. The mercaptans are taken off the top of the stripper through line 17. The regenerated alkali solution is withdrawn from the steam stripper through line 19 and is either recycled through line 21 to treating vessel 5 or charged to mixer 23. Preferably, however, the regenerated alkali solution is recycled until 10% or more of phenols and/or naphthenic acids have accumulated in the treating solution at which time either the entire used and regenerated alkali may be charged to mixer 23 or a portion charged to mixer 23 and a portion recycled through line 21.

Sufficient acid or acid salt is added to mixer 23 through line 25 to neutralize the used regenerated alkali solution and spring the acid oils. The resulting mixture is based through line 27 to settler 29 from which acid oil is withdrawn through line 31 and aqueous solution is withdrawn through line 33. The acid oil withdrawn through line 31 is mixed with hexane charged through line 34 and with water charged through line 35, and the mixture passes to mixer 37. Sufficient aqueous sodium hydroxide solution is added to mixer 37 to produce an aqueous solution having a pH between 7 and 9. The amount of caustic soda solution required to be added can be determined by taking a sample of the acid oil-hexane solution, mixing therewith the same proportion of water as is mixed in mixer 37 and titrating the mixture with the aqueous sodium hydroxide solution using phenolphthalein as an indicator until the indicator turns red. The mixture is thoroughly stirred in mixer 37 after which it is permitted to settle and the aqueous solution withdrawn from the bottom of the mixer through line 39 and the washed hexane-acid oil solution withdrawn from the upper portion thereof through line 41. The hexane acid oil solution then passes to still 43 where the hexane is removed by distillation overhead through line 45. The finished acid oil is withdrawn from the still through line 47 to storage tank 49.

The acid oil is withdrawn from storage tank 49 through line 51 as required and mixed with the necessary amount of aqueous caustic alkali solution fed through line 53 into mixed 55. Acid oil dissolves in the aqueous caustic alkali solution to form the treating solution which is then fed as required through line 57 to treating vessel 59. Mercaptan-containing gasoline is fed to treating vessel 59 through line 61 where it is contacted with the treating solution prepared in accordance with our invention.

As an illustration of my invention, acid oil obtained by acidifying aqueous alkali solution which had been used to wash mixed straight run and cracked gasoline obtained from East Texas, Van Zandt and Schuler crudes and from which the readily hydrolyzable compounds, principally mercaptans, had been removed by steaming, was dissolved in an equivalent volume of hexane. The acid oil-hexane solution was placed in contact with a volume of distilled water equal to that of the acid oil hexane solution employed, phenolphthalein indicator added and approximately 50% aqueous sodium hydroxide solution added dropwise and with agitation until the indicator turned red (approximately pH 9). The treated acid oil-hexane solution was separated from the aqueous layer, the hexane removed and the treated acid oil dissolved in aqueous sodium hydroxide solutions. A comparison of the efficacy of this solution with a solution of the same concentration of untreated acid oil for removing mercaptans from gasoline is shown in the table.

Table

|  | Untreated acid oil reagent | Treated acid oil reagent |
| --- | --- | --- |
| Per cent NaOH | 25 | 25 |
| Per cent acid oil | 25 | 25 |
| Per cent water | 50 | 50 |
| Per cent mercaptan sulfur in untreated gasoline | 0.048 | 0.048 |
| Per cent mercaptan sulfur in treated gasoline | 0.011 | 0.0048 |

All of the figures shown in the table are weight percentages. Separate samples of the same untreated gasoline were treated with each reagent. It is readily seen that while the untreated acid oil reagent reduced the mercaptan sulfur content of the gasoline from 0.048 to 0.011 (77% removal) the reagent containing the same amount of treated acid oil reduced the mercaptan sulfur content to 0.0048, a removal of 90% of the mercaptan sulfur originally present.

Regeneration of alkali treating reagents prepared in accordance with this invention may be readily effected by steaming or boiling after such reagents have been used in the treatment of the water-immiscible liquids to remove readily hydolyzable organic acidic compounds such as mercaptans. Where the hydrocarbon or water-immiscible liquid contains hydrogen sulfide it should be pretreated with chemicals such as lime, potassium phosphate, sodium carbonate or sodium hydroxide since hydrogen sulfide interferes with the regeneration of the treating reagent. After removal from the cracked distillate or other liquid to be treated, or non-hydrolyzable acidic compounds or compounds which form non-hydrolyzable reaction products with the alkali treating reagent such as hydrogen sulfide, the weakly acidic compounds which form hydrolyzable reaction products with the alkali treating reagent are then extracted by simply contacting, in continuous counter current or batch operation in the absence of air or other oxidizing medium, the liquid to be treated with the treating reagent and then separating the water-immiscible liquid layer and alkali reagent layer containing the reaction products. The treating reagent containing the reaction products is steamed to decompose the hydrolyzable products and the products of the decomposition removed as vapor.

Alkali treating reagents useful in this invention comprise aqueous and alcoholic alkali metal hydroxide solutions although aqueous solutions are preferred. The reagents may contain in addition to acid oils and alkali, other materials known to enhance the extraction of weakly acidic organic compounds from water-immiscible liquids. The concentration of aqueous alkali solutions which may be used is subject to wide variations, the only requisites being that the acid oils be soluble therein and that the resultant solutions have the ability to extract weakly acidic compounds from water-immiscible liquids. Concentrations of about 5% to 40% by weight of free alkali metal hydroxide may be employed although best results have been obtained when the concentration is above 10%. Sodium and potassium hydroxides are particularly effective alkali metal hydroxides. In referring to the concentration of alkali in the novel treating reagents throughout this specification and in the appended claims it is intended that this term shall refer to "free" alkali, i. e., that alkali over and above the amount required to neutralize the acid oils. The alkali content of the reagent as thus defined may be readily determined by titration with inorganic acid to a phenolphthalein end point. The amount of acid oil incorporated in such aqueous alkali metal hydroxide solutions may also vary between wide limits, up to the limit of solubility of the particular acid oil employed. Best results are obtained when the concentration is at least 15% by weight and not in excess of that amount which is soluble in the particular alkaline solution. It will be apparent that the acid oils may be added to the alkali solution as such or as the alkali compounds since they react with alkali solutions to form alkali compounds.

The term "acid oil" as used in the claims means the oily layer which separates upon neutralization from used alkali solutions resulting from the treatment of cracked petroleum distillates containing acidic compounds such as naphthenic and/or other organic acids and/or phenolic and thiophenolic compounds.

What is claimed is:

1. The method of removing weakly acidic substances from hydrocarbon liquids which comprises contacting said liquids with aqueous alkali metal hydroxide solution to which has been added sufficient material selected from the group consisting of acid oil and the reaction product of alkali metal hydroxide and acid oil, from which acid oil has been removed those constituents soluble in aqueous alkali solution having a pH greater than 7 but not substantially greater than 9, to enhance the ability of said alkali metal hydroxide solution to extract acidic substances from said liquids.

2. The method in accordance with claim 1 in which the alkali metal hydroxide solution contains from 5% to 40% by weight of free alkali metal hydroxide and at least 15% by weight of said acid oil in the form of its reaction product with alkali metal hydroxide.

3. The method in accordance with claim 1 in which the alkali metal hydroxide solution contains above 10% by weight of free alkali metal hydroxide and from 15% by weight up to the maximum amount soluble in the solution, of acid oil in the form of its reaction product with alkali metal hydroxide.

4. The method of removing mercaptans from petroleum distillates which comprises treating said distillates with an aqueous alkali metal hydroxide solution containing from 5 to 40% by weight of free alkali metal hydroxide and from 15% up to the maximum amount soluble in the solution, of material selected from the group consisting of acid oil and the reaction product of alkali metal hydroxide and acid oil from which acid oil has been removed those constituents soluble in aqueous alkali solution having a pH greater than 7 but not substantially greater than 9.

TIMOTHY L. McNAMARA.
LAWRENCE M. HENDERSON.